(12) United States Patent
Andrade et al.

(10) Patent No.: US 12,318,639 B2
(45) Date of Patent: Jun. 3, 2025

(54) WEB HARNESS WAIST PAD BELTS

(71) Applicant: Alexander Andrew, Inc., Compton, CA (US)

(72) Inventors: Samuel Raymond Andrade, Norwalk, CA (US); Joseph John Parisi, Huntington Beach, CA (US)

(73) Assignee: Alexander Andrew, Inc., Compton, CA (US)

( * ) Notice: Subject to any disclaimer, the term of this patent is extended or adjusted under 35 U.S.C. 154(b) by 1010 days.

(21) Appl. No.: 16/846,353

(22) Filed: Apr. 12, 2020

(65) Prior Publication Data

US 2021/0316176 A1 Oct. 14, 2021

(51) Int. Cl.

| A62B 35/00 | (2006.01) |
|---|---|
| A62B 35/04 | (2006.01) |
| B32B 3/26 | (2006.01) |
| B32B 5/18 | (2006.01) |
| B32B 5/22 | (2006.01) |
| B32B 5/24 | (2006.01) |
| B32B 5/26 | (2006.01) |

(52) U.S. Cl.
CPC ...... *A62B 35/0025* (2013.01); *A62B 35/0018* (2013.01); *A62B 35/0031* (2013.01); *A62B 35/04* (2013.01); *B32B 3/266* (2013.01); *B32B 5/18* (2013.01); *B32B 5/22* (2013.01); *B32B 5/245* (2013.01); *B32B 5/26* (2013.01); *B32B 2274/00* (2013.01); *B32B 2305/38* (2013.01); *B32B 2413/00* (2013.01); *B32B 2571/02* (2013.01)

(58) Field of Classification Search
CPC ............ A62B 35/0025; A62B 35/0018; A62B 35/0031; A62B 35/04; B32B 3/266; B32B 5/18; B32B 5/22; B32B 5/245; B32B 5/26; B32B 2274/00; B32B 2305/38; B32B 2413/00; B32B 2571/02; A41F 9/00

See application file for complete search history.

(56) References Cited

U.S. PATENT DOCUMENTS

| 2,834,525 | A | * | 5/1958 | Shawgo | F16P 1/00 182/9 |
|---|---|---|---|---|---|
| 7,454,800 | B2 | * | 11/2008 | Taylor | A62B 25/00 2/338 |
| 2009/0235431 | A1 | * | 9/2009 | Bevley | A41F 9/00 2/338 |
| 2013/0008742 | A1 | * | 1/2013 | Schurian | A62B 35/0031 182/3 |
| 2014/0060969 | A1 | * | 3/2014 | Seman | A62B 35/0025 182/3 |
| 2015/0004131 | A1 | * | 1/2015 | Milstein | A61P 39/00 250/516.1 |
| 2015/0165247 | A1 | * | 6/2015 | Mursu | A41D 13/0506 2/465 |

* cited by examiner

*Primary Examiner* — Khoa D Huynh
*Assistant Examiner* — Erick I Lopez

(57) ABSTRACT

A web harness belt includes multiple layers. A first elastomer layer portion and a second elastomer portion each connected to a ballistic material layer of the multiple layers. The first elastomer layer portion and the second elastomer layer portion each including multiple belt configuration slots.

20 Claims, 8 Drawing Sheets

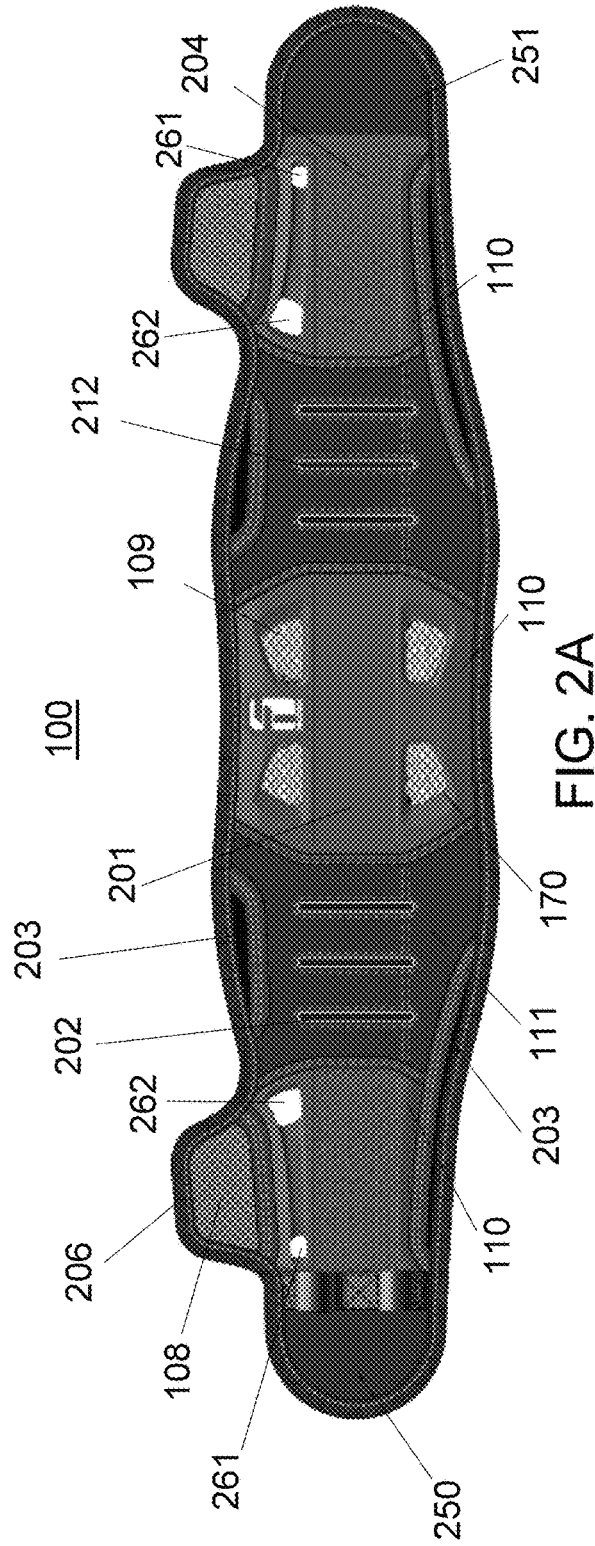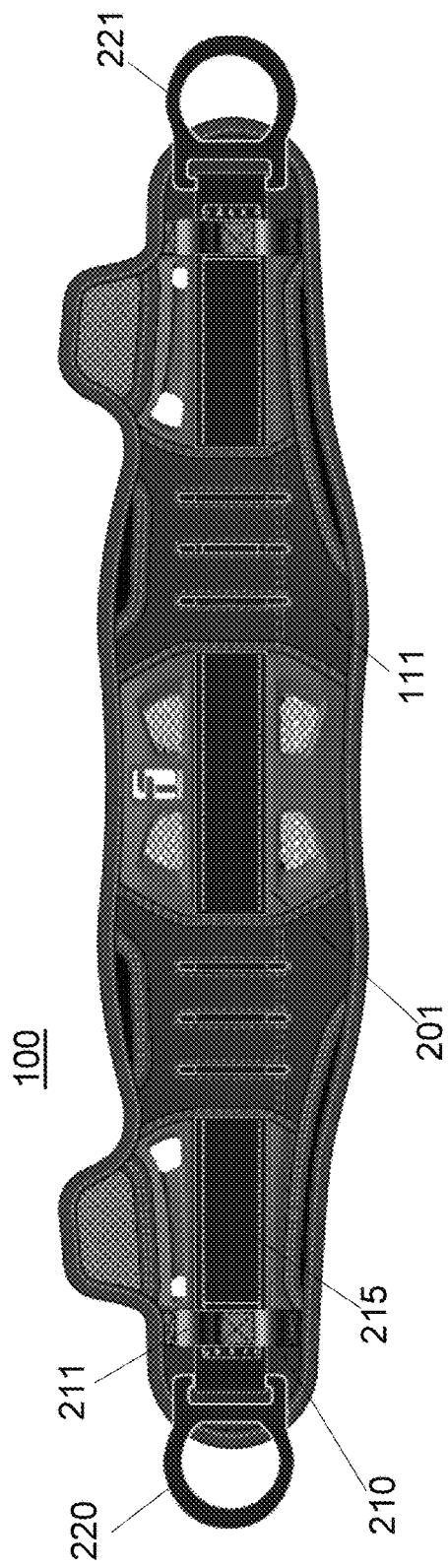

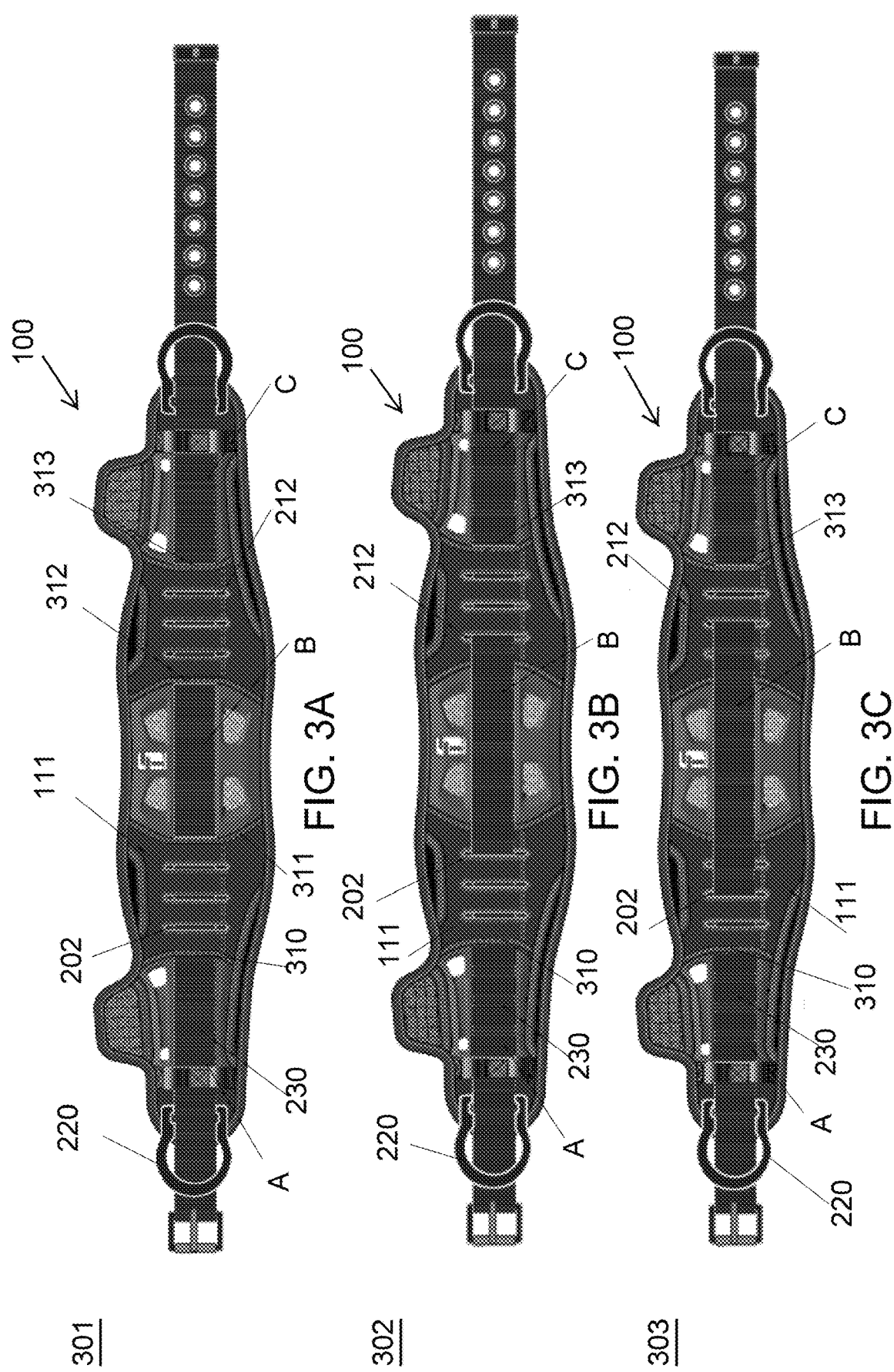

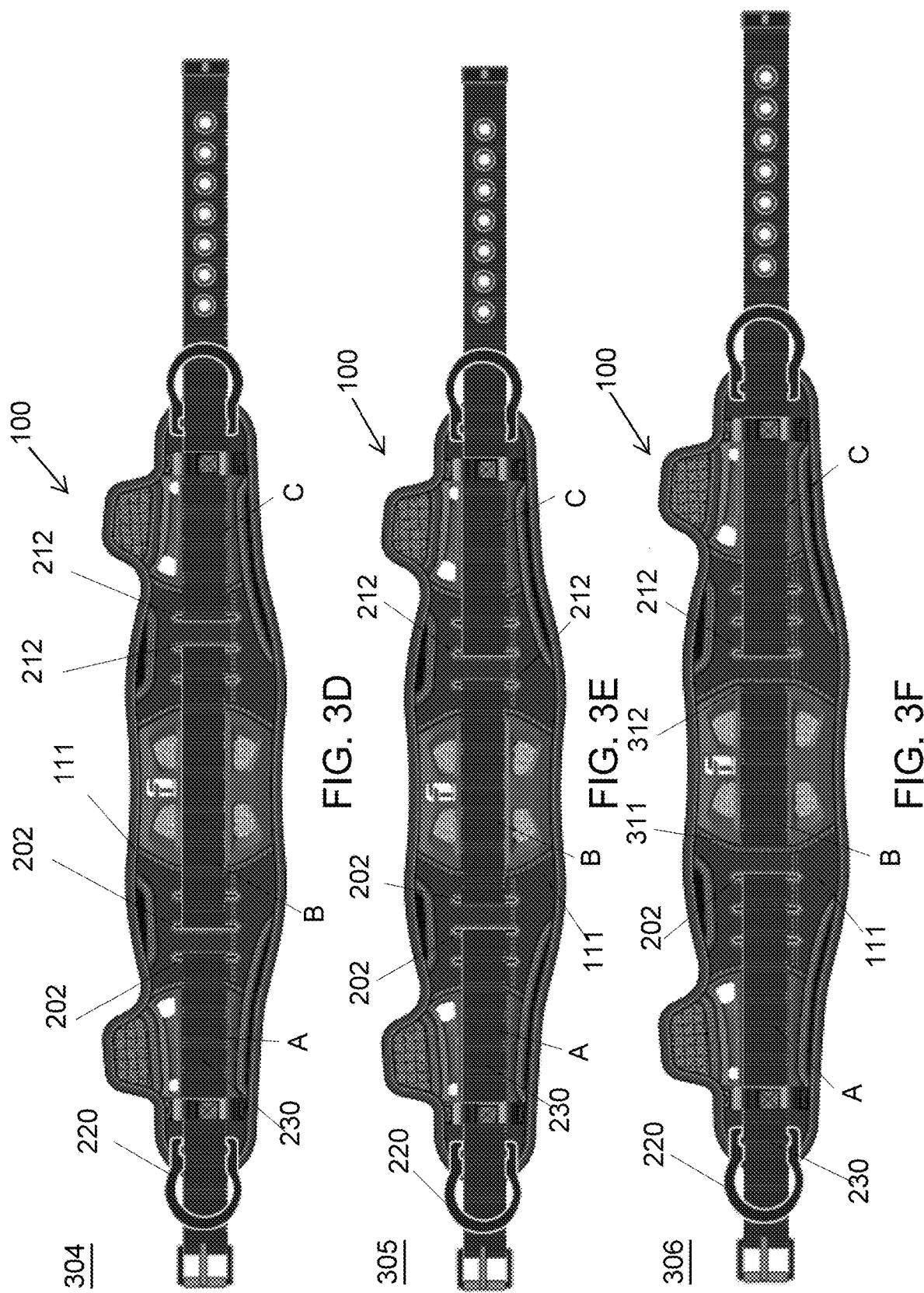

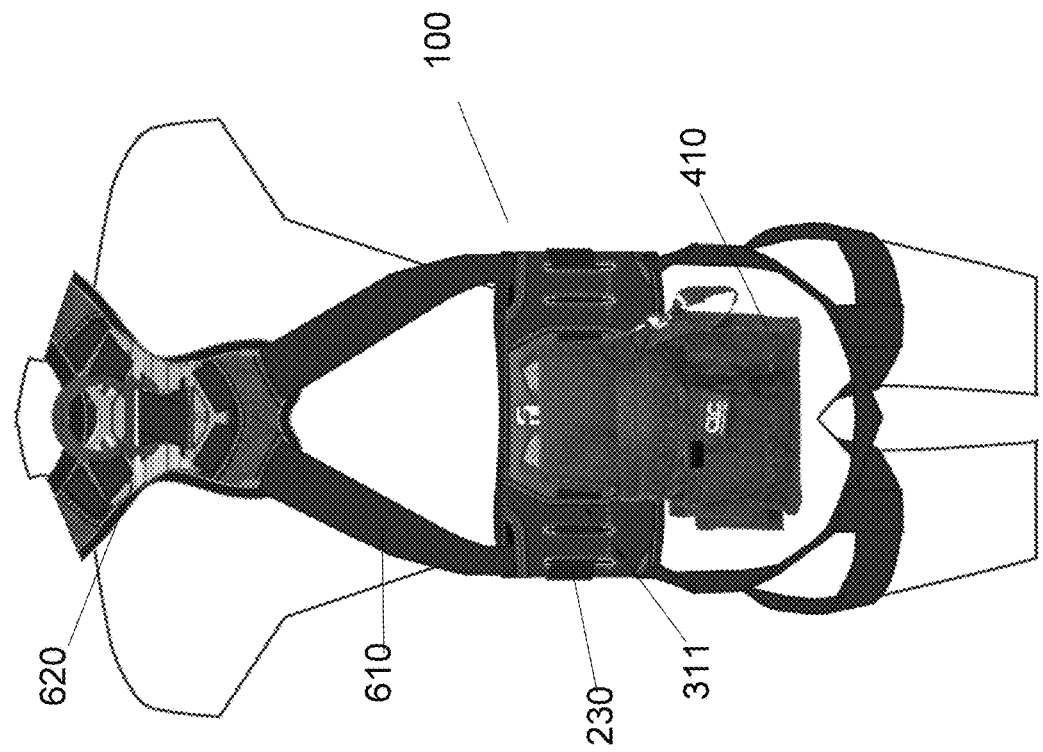
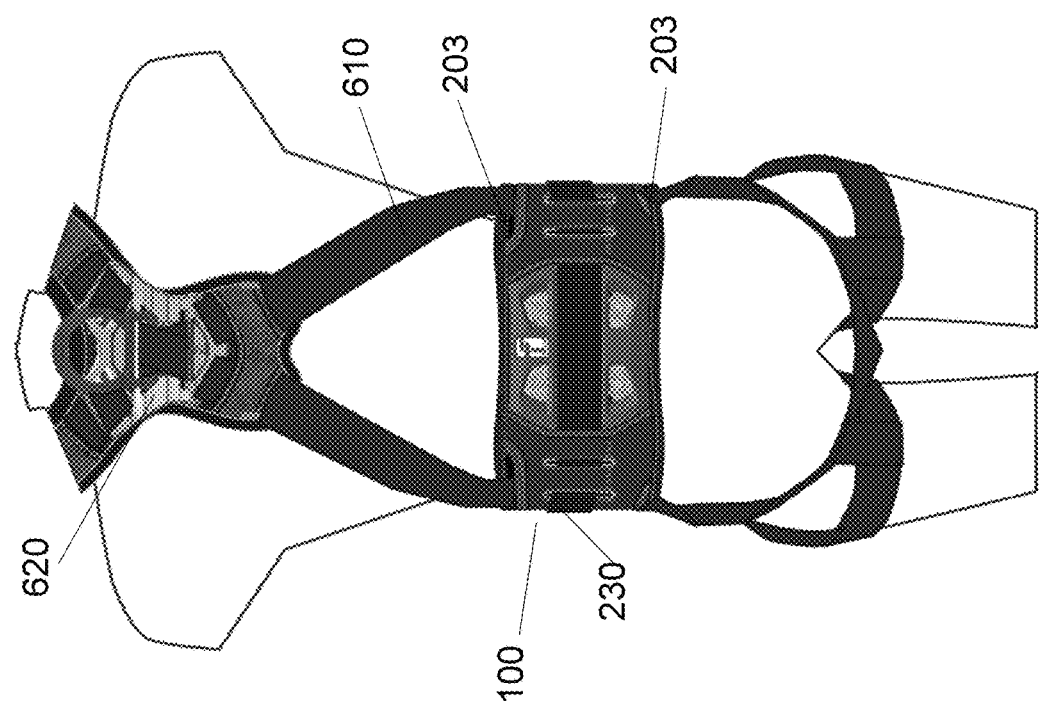
FIG. 6B
FIG. 6A

WEB HARNESS WAIST PAD BELTS

BACKGROUND

Field

The embodiments relate to fall protection harness belts, and in particular to fall protection harness belts including protection elements and adjustable accessory configurations.

Description of the Related Art

Workers that work in elevated environments may employ fall protection gear, such as a fall protection harness belt.

SUMMARY

One embodiment of the invention provides a harness belt including multiple layers. A first elastomer layer portion and a second elastomer portion each connected to a ballistic material layer of the multiple layers. The first elastomer layer portion and the second elastomer layer portion each including multiple belt configuration slots.

Another embodiment of the invention provides a web harness belt including a first mesh layer. A frames layer is connected to the mesh layer. A first padding layer is connected to the frames layer. The first padding layer including a first memory foam portion and a second memory foam portion. A second padding layer is connected to the first padding layer. The second padding layer includes a center portion, a first side portion and a second side portion. A ballistic material layer is connected to the second padding layer. A thermoplastic layer is connected to the ballistic material layer. The thermoplastic layer including a first end portion, a second end portion and a center portion. A first elastomer layer portion and a second elastomer portion are each connected to the ballistic material layer. The first elastomer layer portion and the second elastomer layer portion each includes multiple belt configuration openings.

Still another embodiment of the invention provides a web harness belt that includes a first mesh layer. A frames layer is coupled to the mesh layer. A first padding layer is coupled to the frames layer. The first padding layer including a first memory foam portion and a second memory foam portion. A second padding layer is coupled to the first padding layer. The second padding layer includes a center portion, a first side portion and a second side portion. A first multi-layer fabric portion is coupled to the first side portion of the second padding layer. A second multi-layer fabric portion is coupled to the second side portion of the second padding layer. A ballistic material layer is coupled to the second padding layer. A thermoplastic layer is coupled to the ballistic material layer. The thermoplastic layer includes a first end portion, a second end portion and a center portion. A second mesh layer is coupled between the center portion of the thermoplastic layer and the center portion of the second padding layer. A first elastomer layer portion and a second elastomer portion are each coupled to the ballistic material layer. The first elastomer layer portion and the second elastomer layer portion each includes a plurality of belt configuration openings.

Other aspects and advantages of the present invention will become apparent from the following detailed description, which, when taken in conjunction with the drawings, illustrate by way of example the principles of the invention.

BRIEF DESCRIPTION OF THE DRAWINGS

The embodiments are illustrated by way of example, and not by way of limitation, in the Figures of the accompanying drawings and in which like reference numerals refer to similar elements and in which:

FIG. 2A illustrates an exterior view of a waist pad portion of the web harness belt system of FIG. 1, according to one embodiment of the invention;

FIG. 2B illustrates an exterior view of the waist pad portion of FIG. 2A shown with a D-ring belt, according to one embodiment of the invention;

FIG. 3A illustrates an exterior view of a first configuration for the adjustment belt for the web harness belt system, according to one embodiment of the invention;

FIG. 3B illustrates an exterior view of a second configuration for the adjustment belt for the web harness belt system, according to one embodiment of the invention;

FIG. 3C illustrates an exterior view of a third configuration for the adjustment belt for the web harness belt system, according to one embodiment of the invention;

FIG. 3D illustrates an exterior view of a fourth configuration for the adjustment belt for the web harness belt system, according to one embodiment of the invention;

FIG. 3E illustrates an exterior view of a fifth configuration for the adjustment belt for the web harness belt system, according to one embodiment of the invention;

FIG. 3F illustrates an exterior view of a sixth configuration for the adjustment belt for the web harness belt system, according to one embodiment of the invention;

FIG. 6A illustrates an exterior view of the web harness belt system shown with harness webbing an example shoulder and fall protection connecting portion, according to one embodiment of the invention; and FIG. 6B illustrates the web harness belt system of FIG. 6A shown with an example tool/accessory pouch, according to one embodiment of the invention.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments of fall protection web harness belts or belt systems including protection elements and adjustable accessory configurations, as well as operation and/or component parts thereof. While the following description will be described in terms of fall protection web harness belts, systems and devices for clarity and to place the invention in context, it should be kept in mind that the teachings herein may have broad application to all types of systems, devices and applications.

One embodiment of the invention provides a web harness belt including a multiple layers. A first elastomer layer portion and a second elastomer portion are each connected to a ballistic material layer of the multiple layers. The first elastomer layer portion and the second elastomer layer portion each including multiple belt configuration slots. The embodiments of the invention are very light weight and maintain the webbing of the harness system off a user's body to allow for air to circulate, which helps cool down a user during use. At the same time the embodiments of the invention create an easy-don body forming system that makes the web harness belt embodiments easy to: configure an adjustment belt for desired width(s) of accessory or tool bag connection portions (that connect to the adjustment belt that is connected to the web harness belt).

Figure 1:
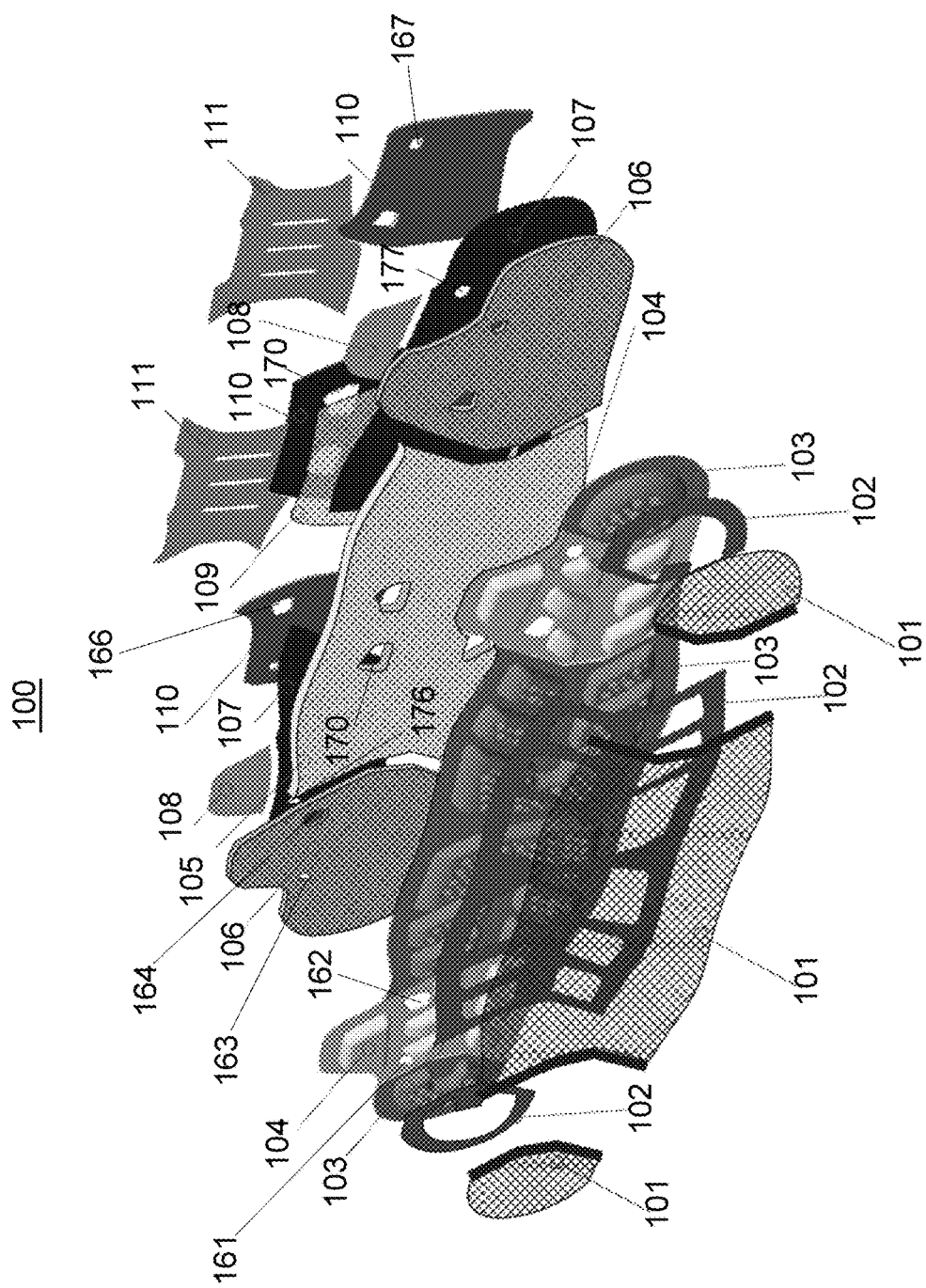
FIG. 1 illustrates a perspective exploded view of a web harness belt system, according to one embodiment of the invention.

FIG. 1 illustrates a perspective exploded view of a web harness belt system 100, according to one embodiment of the invention. In one embodiment, the web harness belt system 100 includes multiple layers that includes: netting (or mesh) 101, which may be made of materials such as polyester, nylon, etc., frames 102 (e.g., 1-3 mm thick, preferably 1.5 mm thick), which may be made of elastomeric polymers (e.g., ethylene vinyl acetate (EVA), etc.), perforated padding 103, which may be made of thermoplastic polymers (e.g., styrene ethylene butylene styrene (SEBS), molded memory foam 104 including vents or windows 161/162 on both sides, padding 105 including multiple vents (or windows) 170 (e.g., having a thickness of 2.5 mm, preferably 3.75 mm), which may be made of open cell foam (e.g., PORON® urethane, etc.), padding 106, which may be made of perforated elastomeric polymers (e.g., EVA, etc.), ballistic material 107 including openings or vents 176/177 on both sides, the ballistic material 107 may be made of 600 denier (600D) polyester, ballistic nylon, etc., multi-layer fabric 108 (e.g., SUPERFABRIC®), which may be made of a base fabric (e.g., nylon, polyester, neoprene, crepe, etc.) and overlaid with small/tiny hard guard plates, etc., mesh fabric 109, thermoplastic rubber layer 110 with two end portions (including openings or vents 166 and 167) and a center portion including multiple vents 170, the thermoplastic rubber layer 119 may be made of thermoplastic rubber (TPR), etc., and waterproof performance elastomer layer 111, which may be made of versatile polyethylene (CSPE) synthetic rubber (CSM), such as HYPALON® and is resistant to chemicals, temperature extremes and ultraviolet light. In one embodiment, the multiple vents 170 of padding 105 and the ballistic material 107 align with each respective opening or vent, and the vents or windows 161/162 of the molded memory foam 104, the vents or windows 163/164 of the padding 106, the vents or windows 176/177 of the ballistic material 107, and the vents or windows 166/167 of the thermoplastic rubber layer 110 align with the respective windows or vents. It should be noted that other similar materials may be used as well without diverting from the scope of the invention. The combination of the components of the web harness assembly system 100 is light weight, comfortable and provides for air to circulate in and onto the body of a user while allowing heat to escape from key perspiration zones of the user's body.

In one example embodiment, elements or portions of the web harness belt system 100 may be made of any flexible or non-flexible plastic composites, including but not limited to: EVA, polyethylene (PE), polypropylene (PP), expanded polyethylene (EPE), nylon, polyoxymethylene (POM), etc. In other examples, other similar materials may be used, such as metals and metal alloys (e.g., steel, steel alloy, aluminum, etc.), or resin materials such as fiberglass, carbon fiber, epoxies, etc.

FIG. 2A illustrates an exterior view of a waist pad portion of the web harness belt system 100 of FIG. 1, according to one embodiment of the invention. In one embodiment, the web harness belt system 100 includes guide portion 201 that includes multiple vents or windows 170 that provide for cooling and escape of heat, perspiration, etc. The guide portion 201 exposes the multi-layer fabric 108 through the vents. The guide portion (or channel) 201 provides for placement of a D-ring belt 215 (FIG. 2B) within the guide portion 201 that includes raised edges and raised portions (or bumps) 204 that provide friction for maintaining the D-ring belt 215 and preventing sliding/slipping of the D-ring belt 215 within the guide portion 201.

In one embodiment, the web harness belt system 100 further includes belt configuration openings (or slots) 202/212 that provide for exposing different portions of an adjustment belt 230 (FIGS. 2C-D, 3A-F, 4A-B, 5A-B, and 6A-B) for different sized accessory bags/holders connection widths. In one embodiment, each side of the web harness belt system 100 includes three (3) configuration openings 202/212. Other embodiments may have more (e.g., 4, 5, etc.) or less (e.g., at least 2) configuration openings 202/212. In one embodiment, the web harness belt system 100 further includes harness webbing 610 (FIGS. 6A-B) slots 203 for placement of the harness webbing 610. In one embodiment, the web harness belt system includes reinforced ribbing or binding 206 for providing additional support and protection. In one embodiment, the web harness belt system 100 includes the vents or windows 261/262 that are formed from the vents or windows from the respective inner layers (e.g., molded memory foam 104, the padding 106, the ballistic material 107 and the thermoplastic rubber layer 110).

Figure 2C:
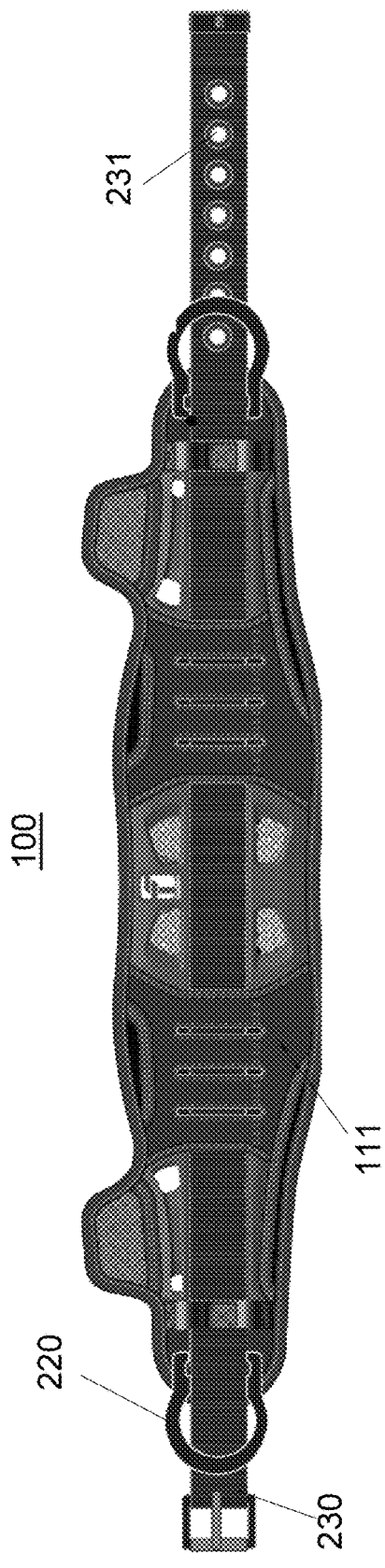
FIG. 2C illustrates an exterior view of the waist pad portion of FIG. 2A shown with the D-ring belt and adjustment belt, according to one embodiment of the invention.

FIG. 2B illustrates an exterior view of the waist pad portion of the web harness belt system 100 of FIG. 2A shown with a D-ring belt 215, according to one embodiment of the invention. The D-ring belt 215 includes D-ring connectors 220 and 221 on either side of the D-ring belt 215, which may be used for attaching connectors such as lanyards and other fall protection devices, webbing, snap hooks, etc. The D-ring belt 215 may be made of strong material, such as webbing, reinforced webbing, etc. The D-rings 220/221 may be made of steel or strong metals, metal alloys, etc. In one embodiment, the D-ring belt 215 is attached to the web harness belt system 100 via connectors (or loops) 210 that the D-ring belt 215 is placed underneath on each end 250/251 of the web harness belt system 100. In one embodiment, the connectors 210 may include raised portions (or finger portions) 211 (e.g., two) for grabbing with a user's fingers to provide room or space for placement of the D-ring belt 215 and the adjustment belt 230 (FIGS. 2C-D, 3A-F, 4A-B, 5A-B, and 6A-B) underneath.

FIG. 2C illustrates an exterior view of the waist pad portion of the web harness belt system 100 of FIG. 2A shown with the D-ring belt 215 and the adjustment belt 230, according to one embodiment of the invention. In one embodiment, the adjustment belt 230 is placed through the connectors 210 over (on top of) the D-ring belt 215. The adjustment belt 230 includes belt adjustment holes 231 to adjust the size/length of the adjustment belt 230.

Figure 2D:
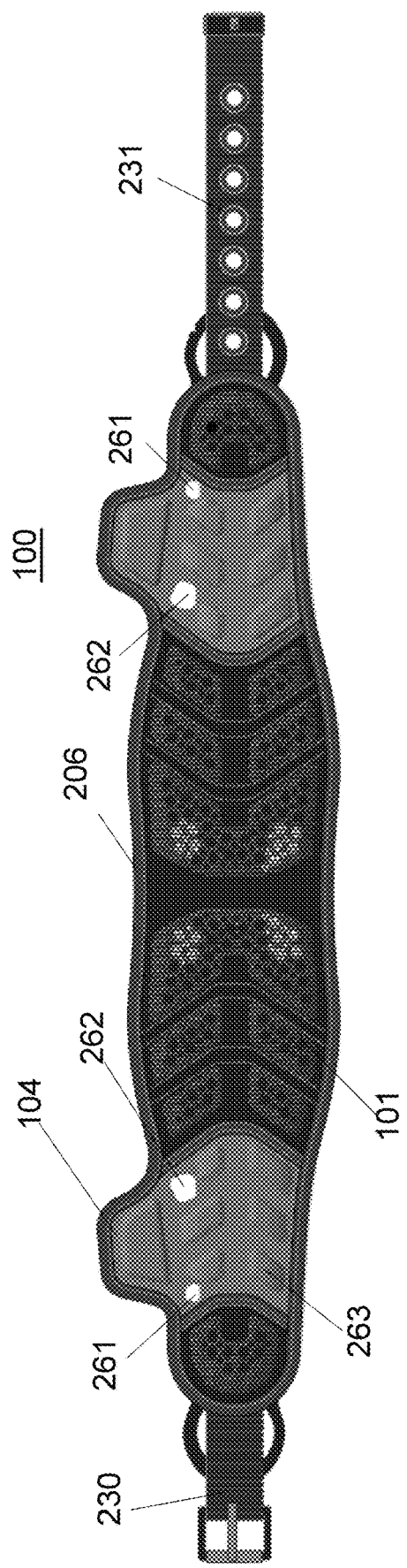
FIG. 2D illustrates an interior view of the waist pad portion of FIG. 2C shown with the D-ring belt and the adjustment belt, according to one embodiment of the invention.

FIG. 2D illustrates an interior view of the waist pad portion of the web harness belt system 100 of FIG. 2C shown with the D-ring belt 215 and the adjustment belt 230, according to one embodiment of the invention. As shown, the molded memory foam 104 includes molded raised portions 263 and the vents or windows 261/262. In one embodiment, the netting 101 and the molded memory foam 104 form the interior portion that touches against a user wearing the web harness belt system 100.

FIG. 3A illustrates an exterior view of a first configuration 301 for the adjustment belt 230 for the web harness belt system 100, according to one embodiment of the invention. The first configuration 301 provides for the adjustment belt 230 to be placed under the waterproof performance elastomer layer 111 through openings 310 and 311 on the left side, and through openings 312 and 313 on the right side. In the first configuration 301, the adjustment belt 230 does not pass through any of the belt configuration openings (or slots) 202 on the left side or 212 on the right side. The first configuration 301 provides for a minimum length of the available (and visible) left portion A, center portion B and right portion C of the adjustment belt 230 that may be used for connecting a utility pouch (e.g., utility pouch (or carrier) 410/411/412/413/414 (FIGS. 4A-B)).

FIG. 3B illustrates an exterior view of a second configuration 302 for the adjustment belt 230 for the web harness belt system 100, according to one embodiment of the invention. The second configuration 302 provides for the adjustment belt 230 to be placed under the waterproof performance elastomer layer 111 through opening 310 and belt configuration opening (or slot) 202 (the third opening from the left) on the left side, and through opening 313 and belt configuration opening (or slot) 212 (the third opening from the right) on the right side. The second configuration 302 provides for a minimum length of the available (and visible) left portion A and right portion C, and a larger length (i.e., the distance between the farthest opening 202 on the left side from the left end of the adjustment belt 230 to the farthest opening 212 on the right side from the right end of the adjustment belt 230) for the center portion B that may be used for connecting a utility pouch (e.g., utility pouch (or carrier) 410/411/412/413/414 (FIGS. 4A-B)). The center portion B for the second configuration 302 has a longer length that may be used for connecting a utility pouch than the length of the center portion B for the first configuration 301 (FIG. 3A).

FIG. 3C illustrates an exterior view of a third configuration 303 for the adjustment belt 230 for the web harness belt system 100, according to one embodiment of the invention. The third configuration 303 provides for the adjustment belt 230 to be placed under the waterproof performance elastomer layer 111 through opening 310 and belt configuration opening (or slot) 202 (the second opening from the left) on the left side, and through opening 313 and belt configuration opening (or slot) 212 (the second opening from the right) on the right side. The third configuration 303 provides for a minimum length of the available (and visible) left portion A and right portion C, and a larger length (i.e., the distance between the second opening 202 on the left side from the left end of the adjustment belt 230 to the second opening 212 on the right side from the right end of the adjustment belt 230) for the center portion B that may be used for connecting a utility pouch (e.g., utility pouch (or carrier) 410/411/412/413/414 (FIGS. 4A-B)). The center portion B for the third configuration 303 has a longer length that may be used for connecting a utility pouch than the length of the center portion B for the second configuration 302 (FIG. 3B).

FIG. 3D illustrates an exterior view of a fourth configuration 304 for the adjustment belt 230 for the web harness belt system 100, according to one embodiment of the invention. The fourth configuration 304 provides for the adjustment belt 230 to be placed mostly over the waterproof performance elastomer layer 111 through two belt configuration openings (or slots) 202 (through the first opening from the left and out from the second opening) on the left side, and through belt configuration openings (or slots) 212 (through the second opening from the right and out from the first opening) on the right side. The fourth configuration 304 provides for a larger length of the available (and visible) left portion A and right portion C than the first, second and third configurations (301, 302 and 303), and a same length (i.e., the distance between the second opening 202 on the left side from the left end of the adjustment belt 230 to the second opening 212 on the right side from the right end of the adjustment belt 230) for the center portion B that may be used for connecting a utility pouch (e.g., utility pouch (or carrier) 410/411/412/413/414 (FIGS. 4A-B)). The center portion B for the fourth configuration 304 has a same length that may be used for connecting a utility pouch as the length of the center portion B for the third configuration 303 (FIG. 3C).

FIG. 3E illustrates an exterior view of a fifth configuration 305 for the adjustment belt 230 for the web harness belt system 100, according to one embodiment of the invention. The fifth configuration 305 provides for the adjustment belt 230 to be placed mostly over the waterproof performance elastomer layer 111 through two belt configuration openings (or slots) 202 (through the second opening from the left and out from the third opening) on the left side, and through belt configuration openings (or slots) 212 (through the third opening from the right and out from the second opening) on the right side. The fifth configuration 305 provides for a larger length of the available (and visible) left portion A and right portion C than the fourth configuration 304, and a same length (i.e., the distance between the third opening 202 on the left side from the left end of the adjustment belt 230 to the third opening 212 on the right side from the right end of the adjustment belt 230) for the center portion B that may be used for connecting a utility pouch (e.g., utility pouch (or carrier) 410/411/412/413/414 (FIGS. 4A-B)). The center portion B for the fifth configuration 305 has a same length that may be used for connecting a utility pouch as the length of the center portion B for the second configuration 302 (FIG. 3B).

FIG. 3F illustrates an exterior view of a sixth configuration 306 for the adjustment belt 230 for the web harness belt system 100, according to one embodiment of the invention. The sixth configuration 306 provides for the adjustment belt 230 to be placed mostly over the waterproof performance elastomer layer 111 through one belt configuration opening (or slot) 202 (through the third opening from the left and out from the opening 311) on the left side, and through the opening 312 and out the belt configuration opening (or slot) 212 (out from the third opening) on the right side. The sixth configuration 306 provides for a largest length of the available (and visible) left portion A and right portion C than the fifth configuration 305, and the minimum length (i.e., the distance between the opening 311 on the left side to the opening 312 on the right side) for the center portion B that may be used for connecting a utility pouch (e.g., utility pouch (or carrier) 410/411/412/413/414 (FIGS. 4A-B)). The center portion B for the sixth configuration 306 has a same length that may be used for connecting a utility pouch as the length of the center portion B for the first configuration 301 (FIG. 3A).

In some embodiments, the selected length for the left portion A, the center portion B and the right portion C of the adjustment belt 230 limits movement for a utility pouch (e.g., utility pouch (or carrier) 410/411/412/413/414 (FIGS. 4A-B)) that is attached/connected to the left portion A, the center portion B and the right portion C. That is, without the use of the configuration opening (or slot) 202/212, a utility pouch would be not have a travel stopping or limiting device to keep the utility pouch (or any other accessory that may be attached to the adjustment belt 230) in a designated location, which can lead to a problem of shifting weight or for a user to have to take the time to move a shifted utility pouch or struggle to reach out for the utility pouch or accessory that is no longer in the desired position on the adjustment belt 230. Additionally, for users that already have a utility pouch or accessory, the ability to adjust the length of the left portion A, the center portion B and the right portion C provides for adapting the lengths to complement the size of the attachment portion of a utility pouch or accessory. These different selectable lengths for left portion A, center portion B and right portion C provide for a user to accommodate varying tool pouch or accessory sizes, which is a very common harness problem in the field as the user has a wide variety of tool pouch and accessory options to choose from; and different disciplines require different pouches or accessories.

Figure 4A:
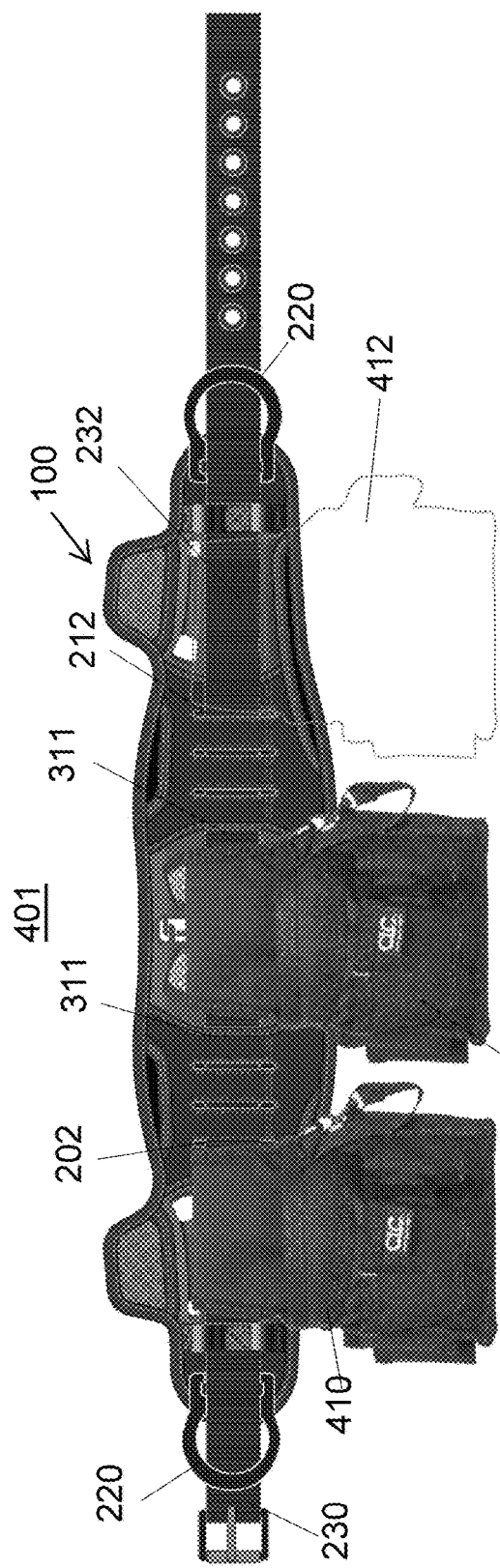
FIG. 4A illustrates an exterior view of another configuration for the adjustment belt for the web harness belt system shown with example tool/accessory pouches coupled with the adjustment belt, according to one embodiment of the invention.

FIG. 4A illustrates an exterior view of another configuration 401 for the adjustment belt 230 for the web harness belt system 100 shown with example tool/accessory pouches 410 and 411 (and optional 412) coupled with the adjustment belt 230, according to one embodiment of the invention.

Figure 4B:
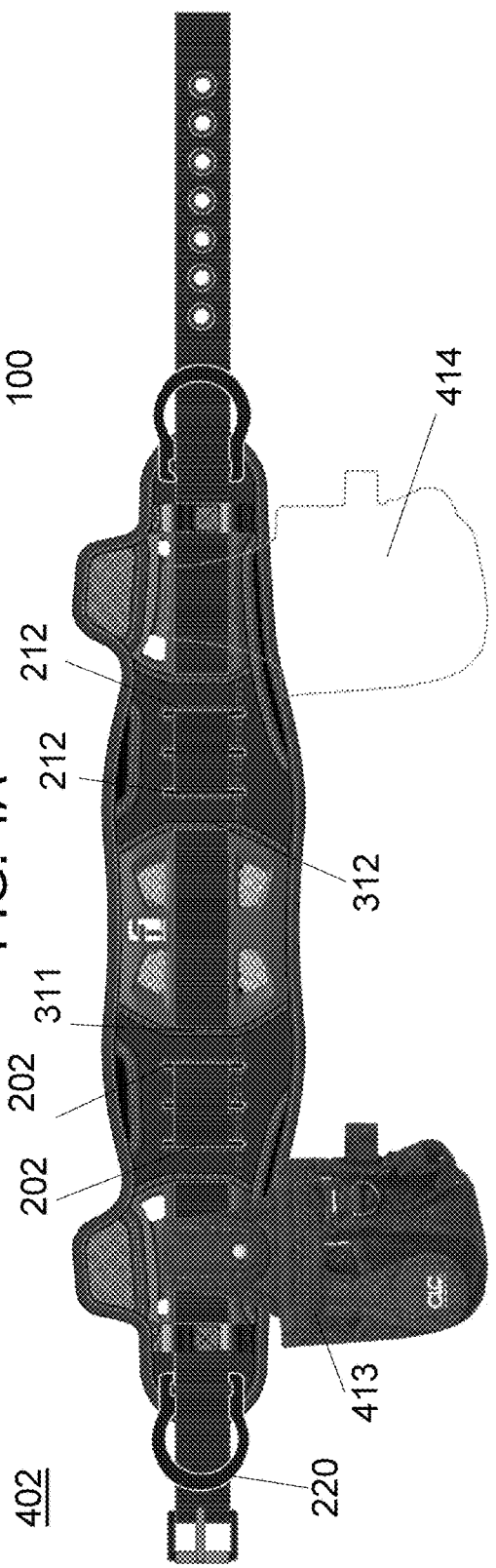
FIG. 4B illustrates an exterior view of yet another configuration for the adjustment belt for the web harness belt system shown with other example tool/accessory pouches coupled with the adjustment belt, according to one embodiment of the invention.

FIG. 4B illustrates an exterior view of yet another configuration 402 for the adjustment belt 230 for the web harness belt system 100 shown with another example tool/accessory pouch 413 (and optional pouch 414) coupled with the adjustment belt 230, according to one embodiment of the invention. As can be seen, the connecting portion (the portion that wraps around the adjustment belt 230) of the utility pouches 413 and 414 have less of a width than that of utility pouches 410, 411 and 412 (FIG. 4A).

Figure 5A:
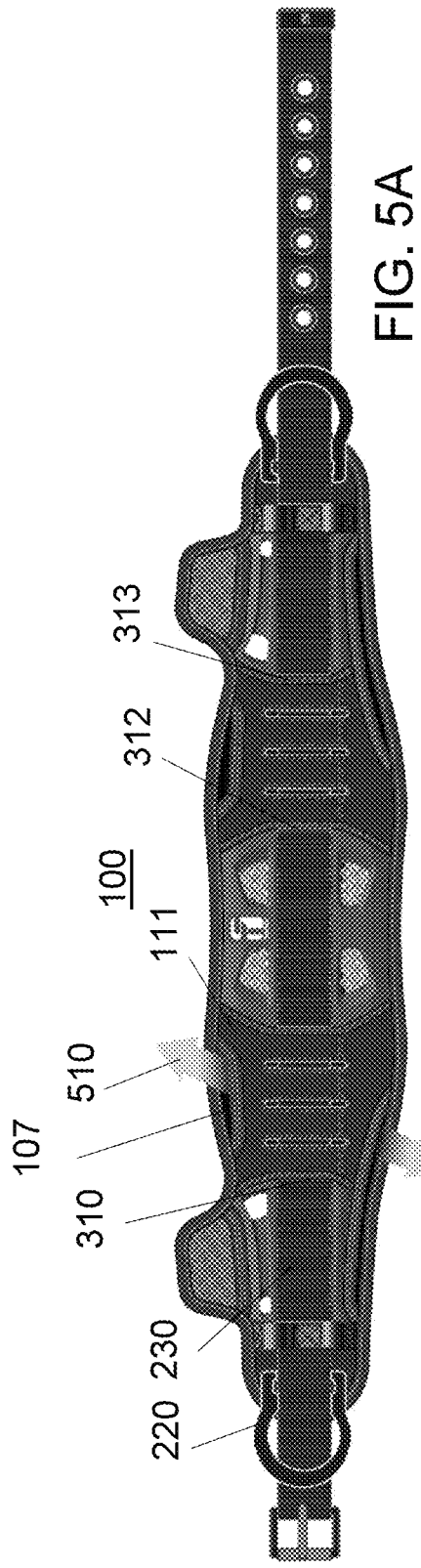
FIG. 5A illustrates an exterior view of the waist pad portion of FIG. 2A shown with the D-ring belt and adjustment belt with the arrow showing the path for harness webbing, according to one embodiment of the invention.

FIG. 5A illustrates an exterior view of the waist pad portion of FIG. 2A shown with the D-ring belt 220 and adjustment belt 230 with the arrow 510 showing the path for harness webbing 610 (FIGS. 6A-B), according to one embodiment of the invention.

Figure 5B:
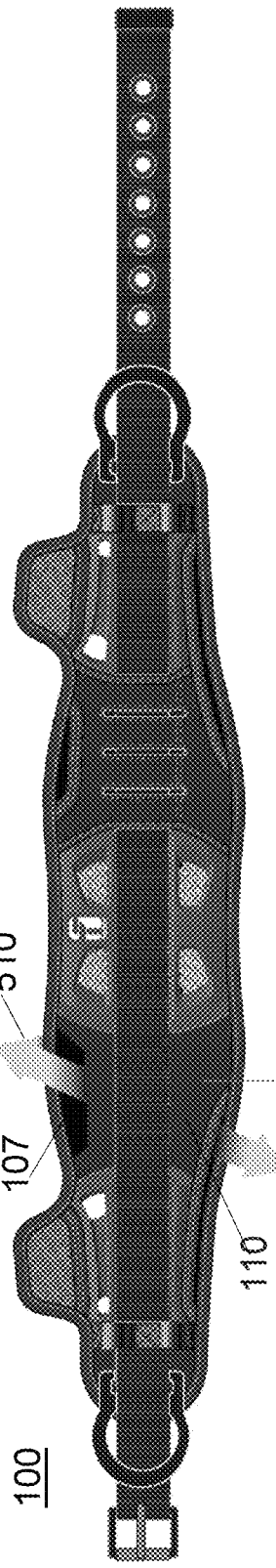
FIG. 5B illustrates the exterior view of the waist pad portion of FIG. 5A shown with the D-ring belt and adjustment belt with the arrow showing the path for harness webbing and an adjusting/configuring portion removed, according to one embodiment of the invention.

FIG. 5B illustrates the exterior view of the waist pad portion of FIG. 5A shown with the D-ring belt 220 and adjustment belt 230 with the arrow 510 showing the path for harness webbing 610 (FIGS. 6A-B) and the waterproof performance elastomer layer 111 removed from the padding assembly 110 for illustration, according to one embodiment of the invention.

Figure 5C:
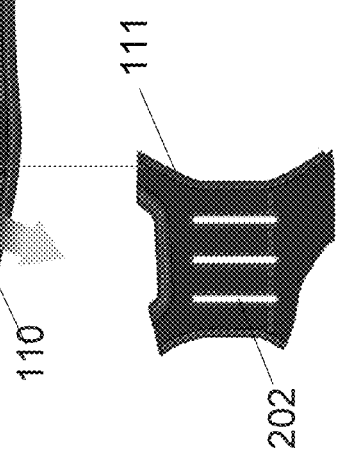
FIG. 5C illustrates an isolated view of the waterproof performance elastomer layer for the web harness belt system, according to one embodiment of the invention.

FIG. 5C illustrates an isolated view of the waterproof performance elastomer layer 111 for the web harness belt system 230, according to one embodiment of the invention.

FIG. 6A illustrates an exterior view of the web harness belt system 100 shown with harness webbing 610 for an example shoulder and fall protection connecting portion 620, according to one embodiment of the invention. FIG. 6B illustrates the web harness belt system 100 of FIG. 6A shown with an example tool/accessory pouch 410, according to one embodiment of the invention. Some embodiments include portions that are ergonomically molded for comfort and perforated to provide ventilation for cooling.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A web harness belt comprising:
   an adjustment belt;
   a first mesh layer;
   a frames layer coupled to the mesh layer;
   a first padding layer coupled to the frames layer, the first padding layer including a first memory foam portion and a second memory foam portion;
   a second padding layer coupled to the first padding layer, the second padding layer including a center portion, a first side portion and a second side portion;
   a ballistic material layer coupled to the second padding layer;
   a thermoplastic layer coupled to the ballistic material layer, the thermoplastic layer including a first end portion, a second end portion and a center portion;
   a D-ring belt coupled to the thermoplastic layer, the D-ring belt have a first end coupled to a first D-ring, and a second end coupled to a second D-ring; and
   a first elastomer layer portion and a second elastomer portion are each coupled to the ballistic material layer, and the first elastomer layer portion and the second elastomer layer portion each includes a plurality of belt configuration openings that expose one or more portions of the adjustment belt for adjusting an available length for the one or more portions of the adjustment belt for attachment of different sized utility pouches;

wherein the adjustment belt including an adjustment portion disposed through the first D-ring, a buckle portion disposed through the second D-ring, the plurality of belt configuration openings are slots, the D-ring belt is attached to the web harness belt via a first connector including a first set of loops, a second connector including a second set of loops, and the first set of loops and the second set of loops are disposed over the D-ring belt.

2. The web harness belt of claim 1, further comprising:
a first multi-layer fabric portion coupled to the first side portion of the second padding layer; and
a second multi-layer fabric portion coupled to the second side portion of the second padding layer.

3. The web harness belt of claim 2, further comprising a second mesh layer coupled between the center portion of the thermoplastic layer and the center portion of the second padding layer.

4. The web harness belt of claim 2, wherein the first and the second multi-layer fabric portions each comprising a base fabric.

5. The web harness belt of claim 2, wherein the first memory foam portion including a first plurality of vents, the second memory foam portion including a second plurality of vents, the center portion of the second padding layer including a third plurality of vents, the first side portion of the second padding layer including a fourth plurality of vents, and the second side portion of the second padding layer including a fifth plurality of vents.

6. The web harness belt of claim 5, wherein the ballistic material layer including a first side portion and a second side portion, the first side portion of the ballistic material layer including a sixth plurality of vents, the second side portion of the ballistic material layer including a seventh plurality of vents, the first end portion of the thermoplastic layer including an eight plurality of vents, the second end portion of the thermoplastic layer including a ninth plurality of vents, and the center portion of the thermoplastic layer including a tenth plurality of vents.

7. The web harness belt of claim 6, wherein:
respective vents of the first plurality of vents align with respective vents of the fourth plurality of vents, the sixth plurality of vents and the eight plurality of vents;
respective vents of the second plurality of vents align with respective vents of the fifth plurality of vents, the seventh plurality of vents and the ninth plurality of vents; and
respective vents of the third plurality of vents align with respective vents of the tenth plurality of vents.

8. The web harness belt of claim 7, wherein the D-ring belt is coupled to the adjustment belt.

9. The web harness belt of claim 8, wherein a first harness web slot is formed between the first elastomer layer portion and the first side portion of the ballistic material layer, and a second harness web slot is formed between the second elastomer layer portion and the second side portion of the ballistic material layer.

10. A web harness belt comprising:
an adjustment belt;
a plurality of layers including a thermoplastic layer coupled to a ballistic material layer;

a D-ring belt coupled to the thermoplastic layer, the D-ring belt have a first end coupled to a first D-ring, and a second end coupled to a second D-ring;
a first elastomer layer portion and a second elastomer portion each coupled to the ballistic material layer of the plurality of layers, the first elastomer layer portion and the second elastomer layer portion each including a plurality of belt configuration slots that expose one or more portions of the adjustment belt for adjusting an available length for the one or more portions of the adjustment belt for attachment of different sized utility pouches;
wherein the adjustment belt including an adjustment portion disposed through the first D-ring, a buckle portion disposed through the second D-ring, the plurality of belt configuration openings are slots, the D-ring belt is attached to the web harness belt via a first connector including a first set of loops, and a second connector including a second set of loops, and the first set of loops and the second set of loops are disposed over the D-ring belt.

11. The web harness belt of claim 10, wherein:
the plurality of layers further comprises:
a first mesh layer;
a frames layer coupled to the mesh layer;
a first padding layer coupled to the frames layer, the first padding layer including a first memory foam portion and a second memory foam portion;
a second padding layer coupled to the first padding layer, the second padding layer including a center portion, a first side portion and a second side portion;
the ballistic material layer coupled to the second padding layer; and
the thermoplastic layer including a first end portion, a second end portion and a center portion.

12. The web harness belt of claim 11, further comprising:
a first multi-layer fabric portion coupled to the first side portion of the second padding layer;
a second multi-layer fabric portion coupled to the second side portion of the second padding layer; and
a second mesh layer coupled between the center portion of the thermoplastic layer and the center portion of the second padding layer.

13. The web harness belt of claim 12, wherein the first and the second multi-layer fabric portions each comprising a base fabric.

14. The web harness belt of claim 12, wherein the first memory foam portion including a first plurality of vents, the second memory foam portion including a second plurality of vents, the center portion of the second padding layer including a third plurality of vents, the first side portion of the second padding layer including a fourth plurality of vents, and the second side portion of the second padding layer including a fifth plurality of vents.

15. The web harness belt of claim 14, wherein the ballistic material layer including a first side portion and a second side portion, the first side portion of the ballistic material layer including a sixth plurality of vents, the second side portion of the ballistic material layer including a seventh plurality of vents, the first end portion of the thermoplastic layer including an eight plurality of vents, the second end portion of the thermoplastic layer including a ninth plurality of vents, and the center portion of the thermoplastic layer including a tenth plurality of vents.

16. The web harness belt of claim 15, wherein:
respective vents of the first plurality of vents align with respective vents of the fourth plurality of vents, the sixth plurality of vents and the eight plurality of vents;
respective vents of the second plurality of vents align with respective vents of the fifth plurality of vents, the seventh plurality of vents and the ninth plurality of vents; and
respective vents of the third plurality of vents align with respective vents of the tenth plurality of vents.

17. The web harness belt of claim 16, wherein the D-ring belt is coupled to the adjustment belt.

18. The web harness belt of claim 11, wherein a first harness web slot is formed between the first elastomer layer portion and the first side portion of the ballistic material layer, and a second harness web slot is formed between the second elastomer layer portion and the second side portion of the ballistic material layer.

19. A web harness belt comprising:
an adjustment belt;
a first mesh layer;
a frames layer coupled to the mesh layer;
a first padding layer coupled to the frames layer, the first padding layer including a first memory foam portion and a second memory foam portion;
a second padding layer coupled to the first padding layer, the second padding layer including a center portion, a first side portion and a second side portion;
a first multi-layer fabric portion coupled to the first side portion of the second padding layer;
a second multi-layer fabric portion coupled to the second side portion of the second padding layer;
a ballistic material layer coupled to the second padding layer;
a thermoplastic layer coupled to the ballistic material layer, the thermoplastic layer including a first end portion, a second end portion and a center portion;
a D-ring belt coupled to the thermoplastic layer, the D-ring belt have a first end coupled to a first D-ring, and a second end coupled to a second D-ring;
a second mesh layer coupled between the center portion of the thermoplastic layer and the center portion of the second padding layer; and
a first elastomer layer portion and a second elastomer portion each coupled to the ballistic material layer, the first elastomer layer portion and the second elastomer layer portion each including a plurality of belt configuration openings that expose one or more portions of the adjustment belt for adjusting an available length for the one or more portions of the adjustment belt for attachment of different sized utility pouches;
wherein the adjustment belt including an adjustment portion disposed through the first D-ring, a buckle portion disposed through the second D-ring, the plurality of belt configuration openings are slots, the D-ring belt is attached to the web harness belt via a first set of loops and a second set of loops, and the first set of loops and the second set of loops are disposed over the D-ring belt.

20. The web harness belt of claim 19, wherein:
the first and the second multi-layer fabric portions each comprising a base fabric overlaid with a plurality of guard plates;
the first memory foam portion including a first plurality of vents, the second memory foam portion including a second plurality of vents;
the center portion of the second padding layer including a third plurality of vents;
the first side portion of the second padding layer including a fourth plurality of vents;
the second side portion of the second padding layer including a fifth plurality of vents;
the ballistic material layer including a first side portion and a second side portion;
the first side portion of the ballistic material layer including a sixth plurality of vents;
the second side portion of the ballistic material layer including a seventh plurality of vents;
the first end portion of the thermoplastic layer including an eight plurality of vents;
the second end portion of the thermoplastic layer including a ninth plurality of vents;
the center portion of the thermoplastic layer including a tenth plurality of vents;
respective vents of the first plurality of vents align with respective vents of the fourth plurality of vents, the sixth plurality of vents and the eight plurality of vents;
respective vents of the second plurality of vents align with respective vents of the fifth plurality of vents, the seventh plurality of vents and the ninth plurality of vents;
respective vents of the third plurality of vents align with respective vents of the tenth plurality of vents; and
the adjustment belt is coupled to the D-ring belt.

* * * * *